Sept. 29, 1942.  C. G. McLENDON  2,297,065
PEANUT HARVESTER
Filed Aug. 8, 1941  5 Sheets-Sheet 5

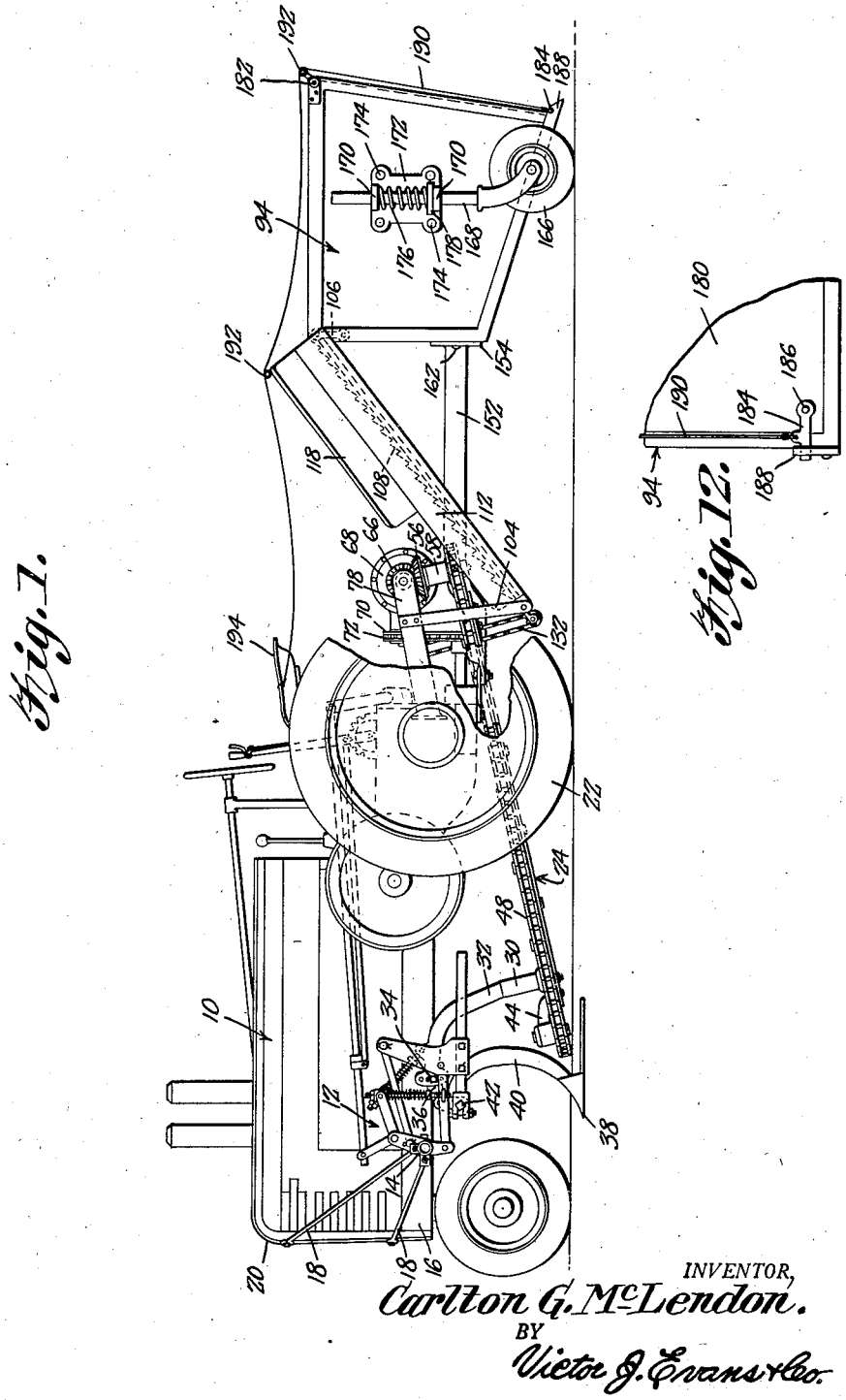

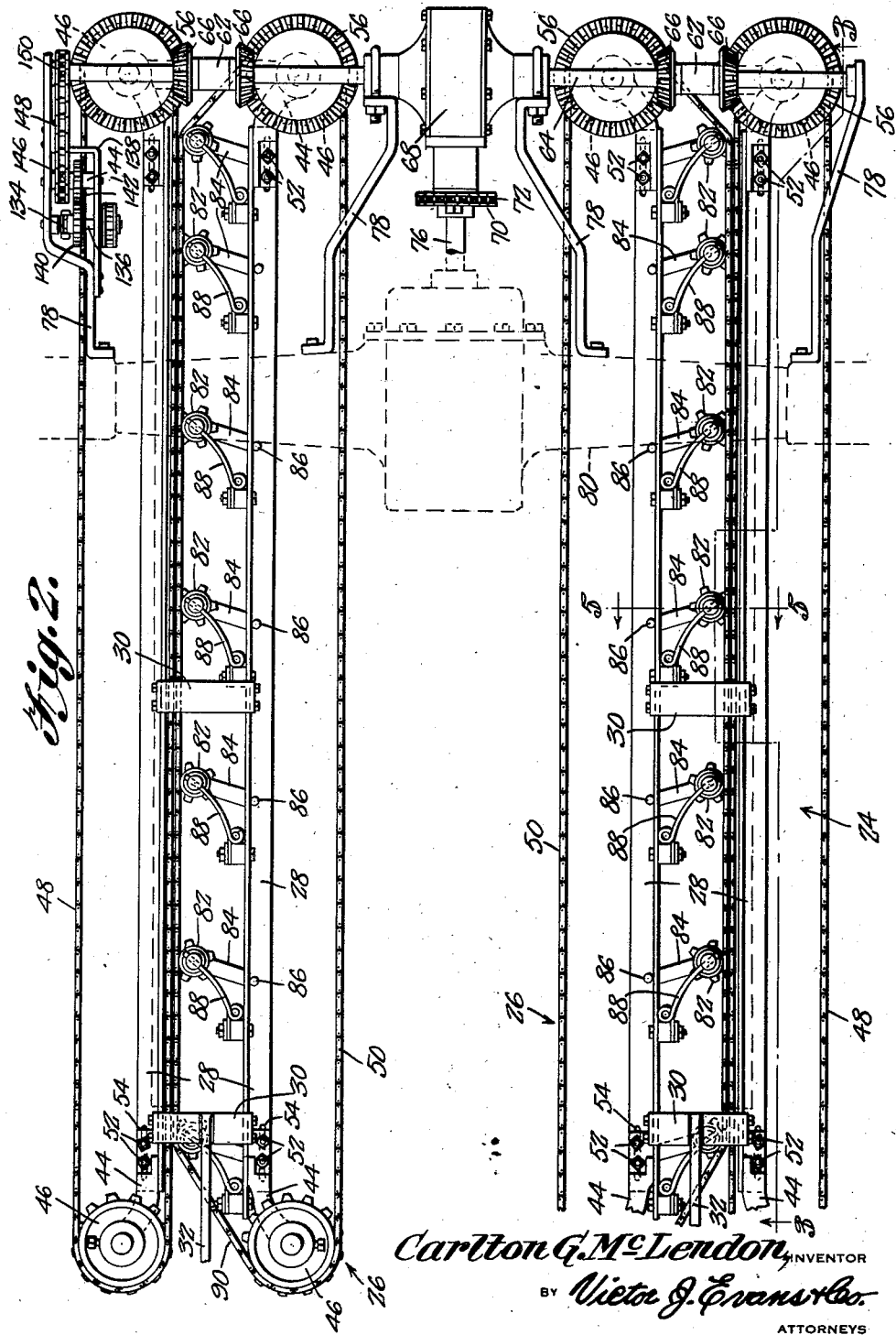

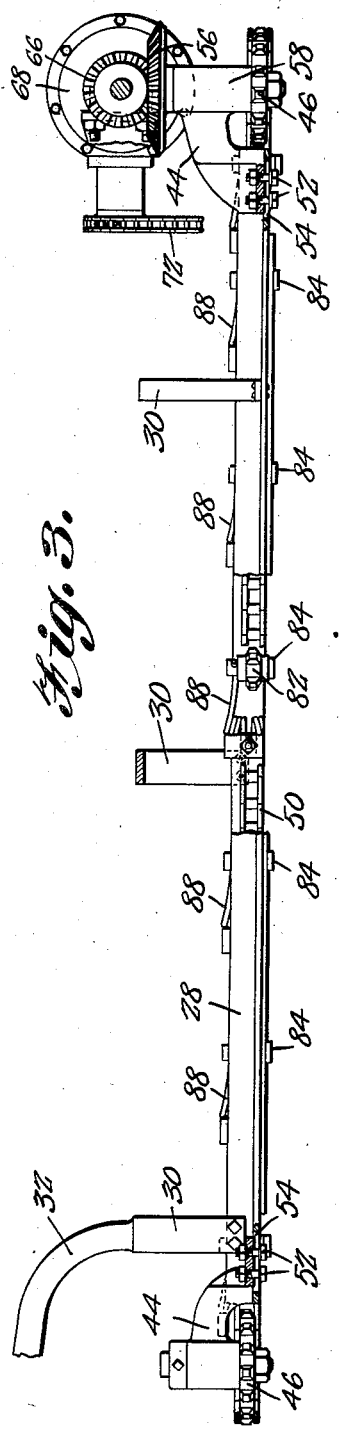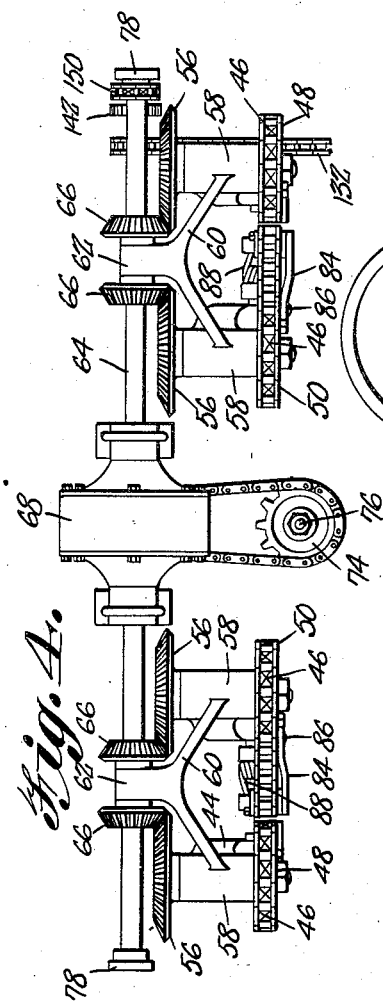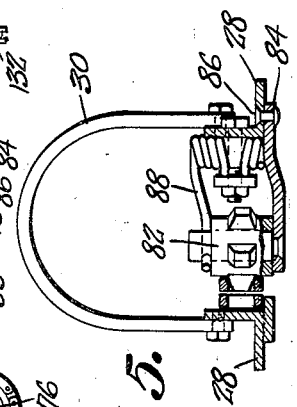

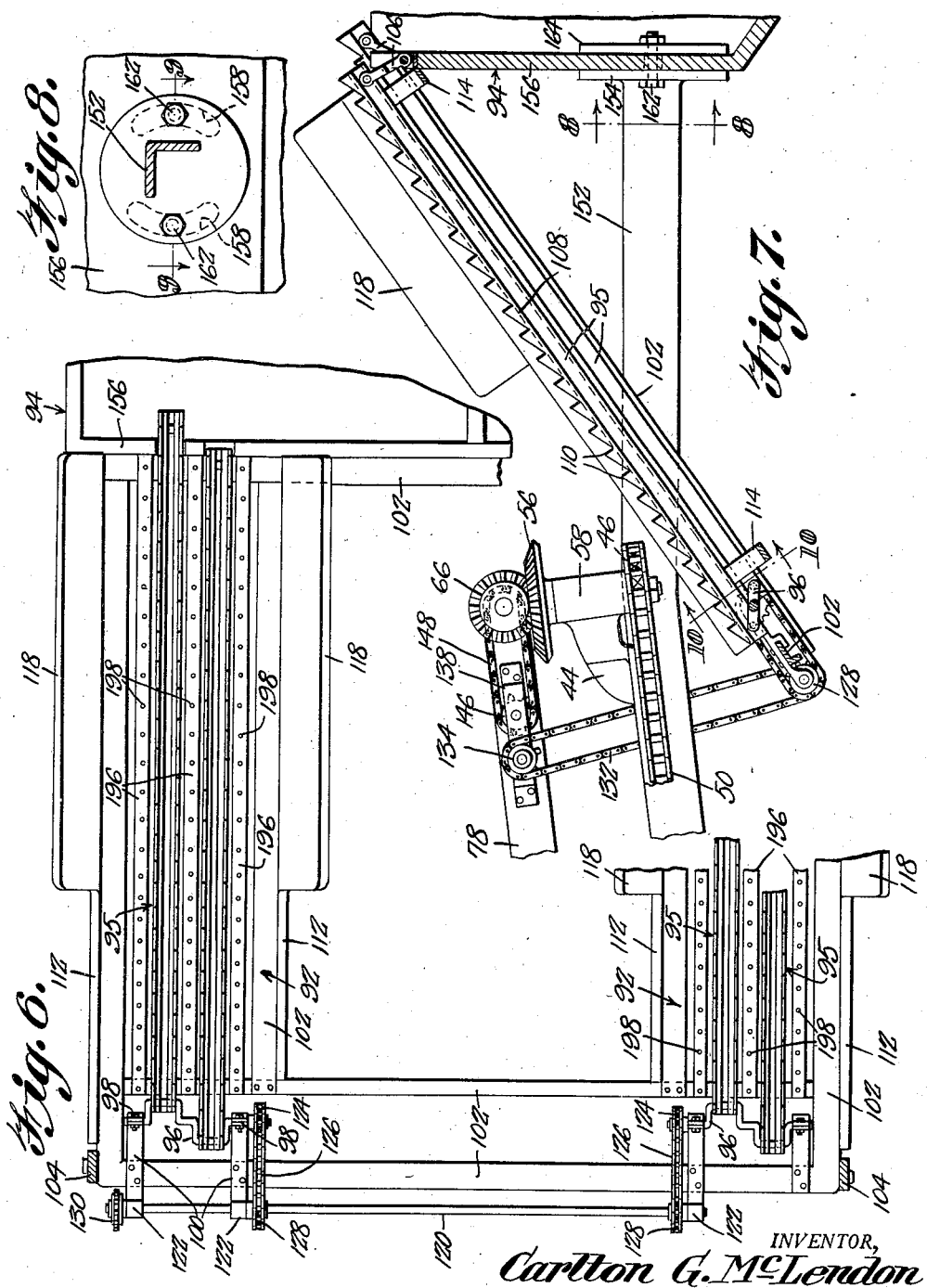

Carlton G. McLendon
INVENTOR.

BY
Victor J. Evans & Co.
ATTORNEYS

Patented Sept. 29, 1942

2,297,065

UNITED STATES PATENT OFFICE 2,297,065

PEANUT HARVESTER

Carlton G. McLendon, Dawson, Ga.

Application August 8, 1941, Serial No. 406,043

5 Claims. (Cl. 55—9)

My invention relates to agricultural machinery, and has among its objects and advantages the provision of an improved peanut harvester.

In the accompanying drawings:

Figure 1 is a side elevational view of a tractor illustrating my invention applied thereto;

Figure 2 is a top plan view of the conveyor mechanism;

Figure 3 is a view taken along the line 3—3 of Figure 2;

Figure 4 is a rear elevational view of the transmission system for the conveyor mechanism;

Figure 5 is a sectional detail view of one of the conveyor tensioning devices;

Figure 6 is a plan view of the greater portion of two peanut elevators which transfer the peanuts from the conveyor mechanism of Figure 2 into the dump hopper of Figure 1;

Figure 7 is a side elevational view of the elevator;

Figure 8 is a view taken from the position indicated by line 8—8 of Figure 7, which illustrates a pivotal connection between the dump hopper and the draw bar attached to the rear axle housing of the tractor;

Figure 12 is a detail view illustrating a trip latch for the dump door of the hopper.

Figure 11:
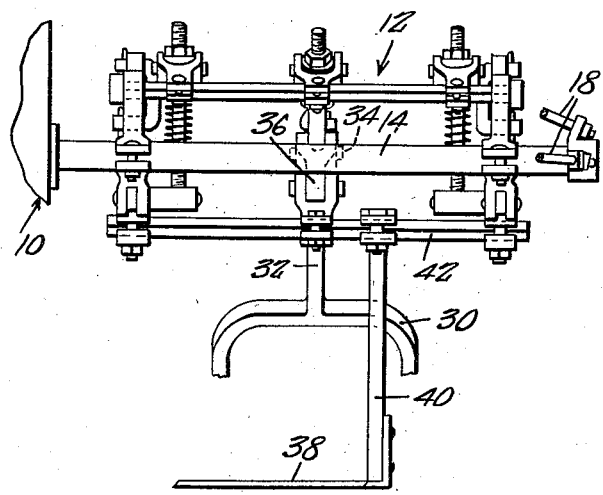
Figure 11 is a front elevational view of one of the tractor rigs to which the forward end of one unit of the conveyor mechanism is connected for support.
Figure 9:
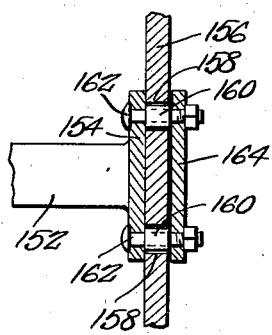
Figure 9 is a sectional view taken substantially along the line 9—9 of Figure 8.

In the embodiment selected for illustration, I make use of a John Deere tractor 10, this tractor being provided with a rig 12 to which cultivating tools are attached. One such rig is located upon each side of the tractor at its forward end in the rear of the front wheels thereof. Only one such rig is illustrated in Figures 1 and 11, but the rigs are identical in construction and operation so that the illustration of one will suffice. In Figures 1 and 11, the rig includes a horizontal supporting bar 14 attached at one end to the tractor frame 16. Brace bars 18 connect the outer end of the horizontal bar 14 with the frame member 20 of the tractor to afford support for the bar as well as the rig load effective thereon.

Between the rear wheels 22 and underneath the tractor is located the conveyor mechanism 24. Referring to Figure 2, the conveyor mechanism 24 comprises two spaced and parallel conveyor units 26, these units being identical in construction and operation. Figure 1 illustrates the conveyor mechanism 24 as being inclined rearwardly of the tractor 10, and the conveyor units 26 lie in a common plane.

Each conveyor unit 26 comprises two angles 28 fixedly interconnected by yokes 30. The forward yokes 30 of the two conveyor units are connected with beams 32, each beam having its upper end bolted at 34 to the member 36 of the rig 12. In advance of each conveyor unit 26 is positioned a plow 38 carried by a plow beam 40 secured to the square shaft 42 of the rig 12. The plow 38 is in the nature of a horizontal blade.

Referring to Figure 2, the description will be directed to the upper conveyor unit 26. Each of the angles 28 is provided with brackets 44 at its ends, each bracket rotatably supporting a sprocket 46. A conveyor chain 48 passes around the sprockets 46 of one of the angles 28 while a conveyor chain 50 passes around the sprockets 46 associated with the other angle. The two chains 48 and 50 lie in a common plane, and the brackets 44 are adjustably connected with their respective angles 28 through the medium of bolts 52 extending through slots 54 in the angles.

In Figures 2 and 4, the rear sprockets 46 are driven by bevel gears 56 rotatably supported by bearings 58 interconnected in pairs by yokes 60 provided with bearings 62 mounted on a drive shaft 64. Each pair of gears 56 is driven by bevel gears 66, connected as a unit and supported in the bearings 62, each unit of gears 66 being splined to the drive shaft 64 for rotation therewith as a unit but adjustable longitudinally of the shaft so that the conveyor units 26 may be adjusted relatively to each other in a horizontal plane in conformity with the spacing of the peanut rows being harvested.

While the rear ends of the conveyor units 56 are floatingly mounted on the shaft 64, the forward ends of the conveyor units may be adjusted longitudinally of their respective bars 42 to properly align the conveyor units with the rows being harvested. The plow beams 40 are also shiftable longitudinally of the bars 42.

Upon the shaft 46 and intermediate its ends is mounted a gear transmission unit 68 driven through the medium of a sprocket 70 and a chain 72 passing about a sprocket 74 keyed to the power take-off shaft 76 of the tractor. Four supporting bars 78 are bolted to the rear axle housing 80 and support the shaft 64. Both conveyor units 26 are driven at the same speed, and the straight inside runs of the chains 50 are yieldingly pressed against the straight inside runs of the chains 48 through the medium of sprockets 82 rotatably mounted on arms 84 pivoted at 86 to the inside angles 28. To the inside angles 28 are secured springs 88 which act on the arms 84 to press the sprockets 82 against the chains 50 for holding the latter in pressure engagement with the chains 48, the inside straight runs of the latter chains being restrained from lateral deflection by reason of the outside angles 28.

Both chains 50 at their forward ends are provided with angular runs 90 which facilitate entry of the vines between the two coacting chains. The vines are effectively held in position between the straight runs of the conveyor chains by reason of the spring tension effective thereon.

Figure 10:
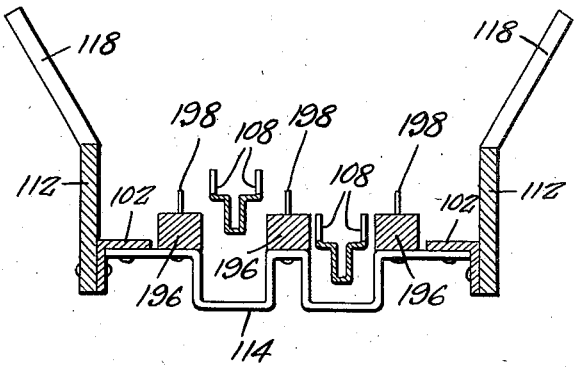
Figure 10 is an enlarged sectional view taken along the line 10—10 of Figure 7.

The vines discharging from the rear ends of the conveyor units 26 are disposed on two elevators 92 for delivery into a dump hopper 94. In Figures 6, 7 and 10, each elevator 92 comprises two bars 95 connected at their lower ends with a crank shaft 96 rotatably journaled in bearings 98 carried by arms 100 bolted to a frame 102, the latter being supported at its lower end through the medium of bars 104 secured at their upper ends to the supporting bars 78. The upper end of the frame 102 is supported on the dump hopper 94. Each upper end of the bars 95 is connected with the dump hopper 94 through the medium of links 106 so that the bars may be oscillated through rotation of the crank shafts 96. The bars 95 each comprise two metallic flanges 108 having teeth 110 so inclined as to elevate the material into the hopper through reciprocation of the bars. Each pair of bars 95 is located between two side boards 112 bolted to the frame 102, this frame having bent bars 114 secured thereto and underlying the bars 95. The upper end of the frame 102 is secured to the dump hopper 94, and the side boards 112 are widened at 118 adjacent the dump hopper.

Means for imparting rotation to the crank shafts 96 comprises a shaft 120 supported in bearings 122 formed on the arms 100. Each crank shaft 96 is provided with a sprocket 124 connected with a chain 126 passing about a sprocket 128 keyed to the shaft 120.

A sprocket 130 is keyed to one end of the shaft 120 for connection with a chain 132 passing around a sprocket 134 keyed to a shaft 136 rotatably journaled in one of the bars 78 and in a bar 138 bolted to that member. A gear 140 on the shaft 136 is in mesh with a gear 142 keyed to a shaft 144 rotatably journaled in the bar 138 and its respective bar 78. To the shaft 144 is keyed a sprocket 146 for connection with a chain 148 passing around a sprocket 150 keyed to the shaft 64.

One end of a draw bar 152 is bolted to the rear transmission housing 80 and the other end of the bar is provided with a plate 154 lying against the front wall 156 of the dump hopper 94. This wall is provided with curved slots 158 for the reception of rollers 160 mounted on bolts 162 passing through the plate 154 and a plate 164 lying against the inner side of the wall 156.

To each end of the dump hopper 94 is secured a supporting wheel 166. Each wheel is connected with an upstanding shank 168 slidable in the end walls 170 of a casting 172 bolted at 174 to one end wall of the dump hopper. A compression spring 176 is interposed between one of the end walls 170 and a flange 178 keyed to each of the shanks so that the dump hopper 94 is resiliently mounted. Because of the slots 158 in the wall 156, the dump hopper 94 may pivot about the axis of the draw bar 158, as when the two wheels 166 are passing over irregular ground.

The rear wall 180 of the dump hopper 94 is pivoted at 182 to the upper part of the wall structure of the hopper and is held closed by a latch bar 184 pivoted at 186 and arranged to drop behind a hook 188 secured to the side wall of the dump hopper. A pull line 190 is connected with the latch pin 184 and passes over grooved wheels 192 and is tied to the seat 194 of the tractor so as to be within easy reach of the operator. The bottom of the hopper declines rearwardly so as to dump the contents therein when the door 180 is unlatched.

The bent bars 114 carry bars 196 which parallel the bars 95. Toothed bars 198 are secured to the bars 196 and operate to hold the vines against downward movement as the bars 95 oscillate downwardly of the vines on their return stroke preparatory to repeated engagement with the vines on their advancing stroke.

I provide a peanut harvester so designed as to be readily associated with a conventional tractor of the type described. Such tractors are provided with power lifts for controlling the rigs 12. The plows or blades 38 effectively loosen the earth formation so that the vines are easily picked up by the conveyor units 26. The vines drop upon the elevators 92 and are delivered to the dump hopper 94. Thus the vines may be dumped at predetermined intervals so as to be conveniently bunched for removal and separation of the peanuts.

Without further elaboration, the foregoing will so fully illustrate my invention, that others may, by applying current knowledge, readily adapt the same for use under various conditions of service.

I claim:

1. In combination with a tractor having rigs and a power take-off shaft, a second shaft rotatably mounted on the tractor transversely thereof and operatively connected with said power take-off shaft, two endless conveyors extending longitudinally of the tractor on opposite sides thereof and respectively supported at their forward ends by said rigs, plows supported on said rigs in advance of the respective conveyors, the rear ends of said conveyors being floatingly supported on said second shaft, operating connections between said second shaft and said conveyors, a dump hopper connected with the tractor rearwardly of said conveyors, and elevators located between said conveyors and the dump hopper and operatively connected with said second shaft.

2. The invention described in claim 1 wherein each of the endless conveyors comprises traveling chains, and in which means are provided for tensioning one chain in each endless conveyor against the other chain of that conveyor.

3. The invention described in claim 1 wherein each of said endless conveyors comprises two traveling chains and in which said operating connections are splined to said second shaft for rotation therewith as a unit but slidable longitudinally on the shaft.

4. The invention described in claim 1 wherein a draw beam is connected at one end with the tractor and at its other end with said dump hopper, and in which means are provided for connecting the dump hopper with said beam for rotation about the longitudinal axis of the beam.

5. The invention described in claim 1 wherein said hopper is provided with resiliently mounted supporting wheels, and in which the hopper is provided with an inclined floor and a pivoted door for releasing the contents of the hopper.

CARLTON G. McLENDON.